Oct. 25, 1932.  J. O. BETTERTON  1,884,533
APPARATUS FOR DEZINCING LEAD
Original Filed May 7, 1926  2 Sheets-Sheet 1
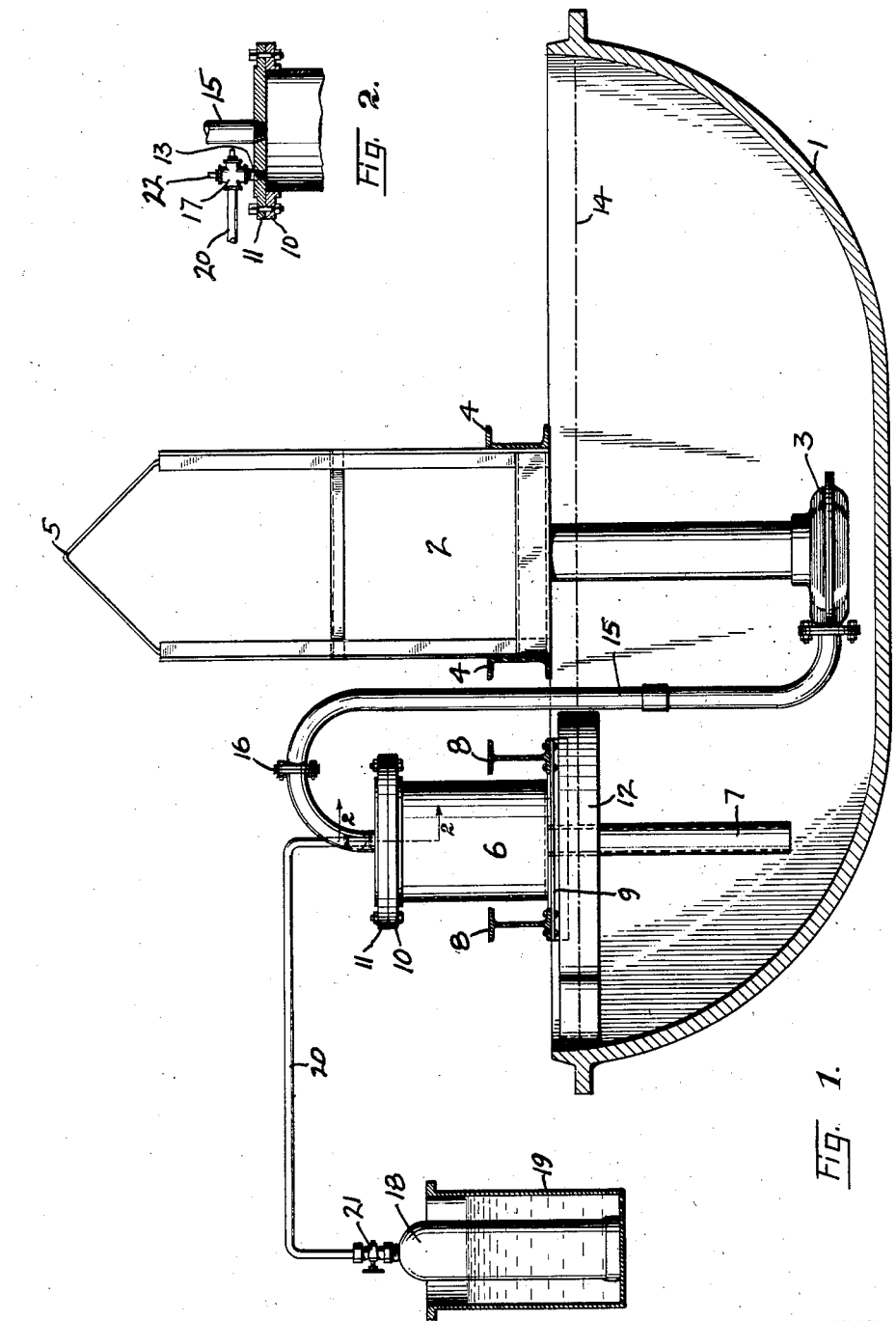
INVENTOR
Jesse Oatman Betterton
BY
Albert N. Austin
ATTORNEY Patented Oct. 25, 1932

1,884,533

UNITED STATES PATENT OFFICE

JESSE OATMAN BETTERTON, OF OMAHA, NEBRASKA, ASSIGNOR TO AMERICAN SMELTING AND REFINING COMPANY, OF NEW YORK, N. Y., A CORPORATION OF NEW JERSEY

APPARATUS FOR DEZINCING LEAD

Application filed May 7, 1926, Serial No. 107,325. Renewed February 27, 1929.

This invention relates to apparatus for refining metals, and, more particularly, to apparatus for dezincing lead.

According to the invention, a metal having as an impurity metals electropositive to said metal, is subjected in a novel manner to the action of a gaseous or other reagent, which unites with the more electropositive metal to remove the same as a slag or dross.

The process makes use of the fact that a reagent such as chlorine has a greater affinity for certain metals, such as metallic zinc, than for other metals, such as metallic lead, when the metals are together in a molten state. For example, lead with zinc as an impurity therein may be the bullion resulting from any metallurgical process. The lead bullion may be that resulting from the Parkes process after the silver has been removed by the use of zinc. In lead resulting from the Parkes process the amount of zinc remaining in the lead may be approximately 0.55 per cent, or 11 pounds of zinc per ton of lead. In order to remove the zinc from the lead approximately 1.085 pounds of chlorine are required theoretically for every pound of zinc, and therefore for every 100 tons of lead there would be required approximately 1193 pounds of chlorine.

According to the invention, practically the entire percentage of zinc is removed by the use of little more than the theoretical amount of chlorine necessary to remove the zinc. This results in great economy of chlorine as well as great safety and comfort in refining, because of the fact that practically no unused chlorine escapes. The reaction of the chlorine with the zinc produces considerable heat. The zinc chloride formed by the reaction, and particularly the chlorine, are very corrosive at the temperature which is produced by the reaction, and are therefore very destructive to metal with which they come in contact. According to the invention, however, the process is so carried out that the chlorine and zinc chloride have no serious effect on the metal of the apparatus which is employed to carry out the process.

According to the invention, a portion of the bath of molten lead containing zinc as an impurity is continuously removed and chlorine is added to such portion, which is then returned to the bath below its surface a sufficient distance to permit a skim or dross of zinc chloride to form on the surface. The process is carried on at a relatively low temperature above the melting point of the lead and at a temperature which will cause the molten dross of zinc chloride to partially solidify on the surface of the bath, thereby forming a seal which tends to prevent the escape of chlorine from the bath. The chlorine is supplied in amounts proportional to the quantities of zinc or other impurities in the bath, and under proper conditions to prevent injury to the walls of the reaction chamber or the pipes or the apparatus for maintaining circulation of the bath.

The reaction between the zinc in the lead bath and chlorine may be considered as two simultaneous reactions:

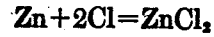

and

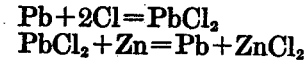

Thus if any lead combines with the chlorine to form lead chloride, the zinc will immediately combine with the lead chloride to form zinc chloride and pure lead, provided sufficient zinc is still present in the bath.

The first skimmings of the kettle will be practically pure zinc chloride. The later skimmings, as the amount of zinc in the bath is decreased, however, may contain some lead chloride in addition to the zinc chloride. This lead chloride may be skimmed off and kept separate and may be used to treat subsequent charges of lead bullion containing zinc prior to treatment with chlorine gas.

Various other features of the invention will be obvious from the following particular description of the process and from the particular description of forms of apparatus for carrying out the process, or from an inspection of the accompanying drawings; and the invention also consists in certain new and novel steps of the process and new and novel features of the construction, and combinations of steps and of parts hereinafter set forth and claimed.

Referring to the drawings which illustrates suitable apparatus for carrying out the process:

Fig. 1 is an elevational view partly in section showing one form of apparatus for carrying out the improved process;

Fig. 2 is a detail taken on the line 2—2 of Fig. 1;

Figure 4:
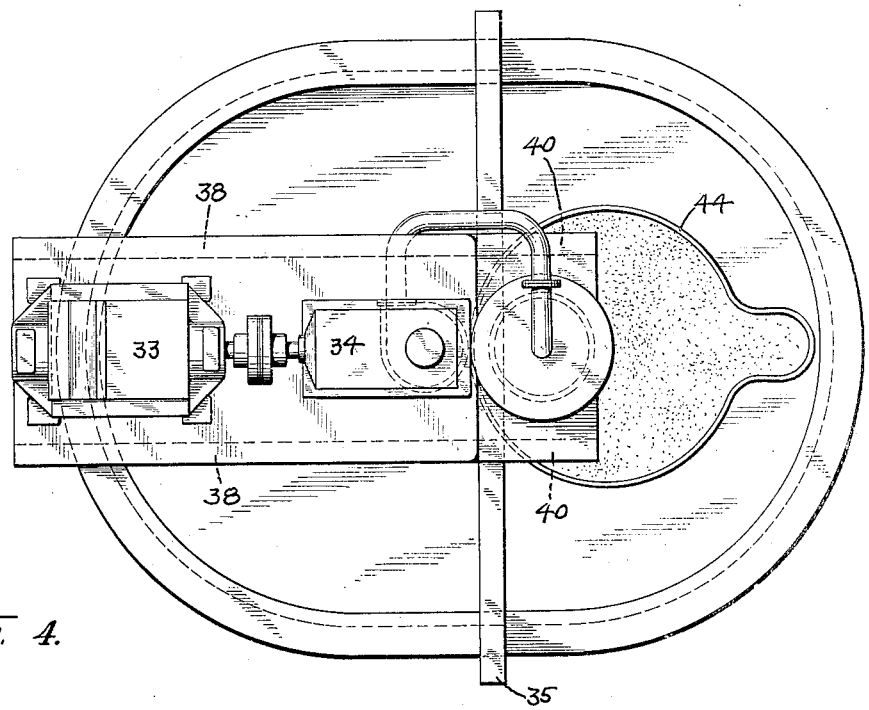
Fig. 4 is a plan view of the apparatus shown in Fig. 3.

In the following description and in the claims parts will be identified by specific names for convenience, but they are intended to be as generic in their application to similar parts as the art will permit.

Referring now to Figs. 1 and 2, the lead kettle 1 may be filled with molten lead containing zinc to the height indicated by the line 14. Supported by the top rim of the kettle is a unit comprising a motor 2 and pump 3, the motor being supported by channel irons 4 extending across the kettle and resting upon the rim thereof. The pump is suspended from the motor and is located near the bottom of the kettle. The unit may be provided with a link 5 by means of which the unit may be carried about the plant, as from this kettle to another kettle.

Supported also on the rim of the kettle 1 is a reaction cylinder 6 which may comprise a short length of pipe, the bottom of the cylinder being closed and having a discharge pipe 7 connected thereto which extends down beneath the surface of the bath a suitable distance. If desired this discharge pipe may not extend below the surface of the molten lead, but the discharge opening may be sealed against escape of chlorine by extending into the chloride slag, or by so proportioning the area of the discharge opening that a body of molten lead (of substantial depth) is maintained in the bottom of the chamber to prevent leakage of the gas. I may even submerge the entire reaction chamber beneath the surface of the molten lead. The reaction cylinder 6 may be supported by two I-beams 8 extending across the kettle, the I-beams having secured at their lower flanges transverse members 9 on which the reaction cylinder rests. The top of the reaction cylinder may be provided with a flange 10 to which may be secured a cylinder head 11. A connecting pipe 15 may be connected from the discharge end of the pump 3 to the top of the head of the reaction cylinder, this pipe having a flanged union 16 for a purpose hereinafter described.

If desired, a four-way union 17 may be connected to the head of the reaction cylinder by a short nipple 13 as shown in Fig. 2, one way being connected to the reaction cylinder and another way being connected to a chlorine tank 18, the other two ways being closed with plugs 22 which may be removed to clean the pipes and the reaction cylinder.

Located conveniently near the kettle may be the source of chlorine, which may be in the form of a chlorine tank 18 immersed in a vessel 19 filled with water and kept at an appropriate temperature. Suitable piping 20 may connect the chlorine tank with the reaction cylinder and a valve 21 may be provided for controlling the flow of the chlorine.

If desirable a ring of iron 12 may be provided to float on the surface of the bath to provide a restricted area in which the slag may be collected and removed.

It is not always advantageous to have the reaction cylinder and pump and motor unit as separate units. Therefore, in Figs. 3 and 4 the reaction cylinder, motor and pump are provided in a single unit, which may be supplied to or removed from the bullion kettle as a unit.

Figure 3:
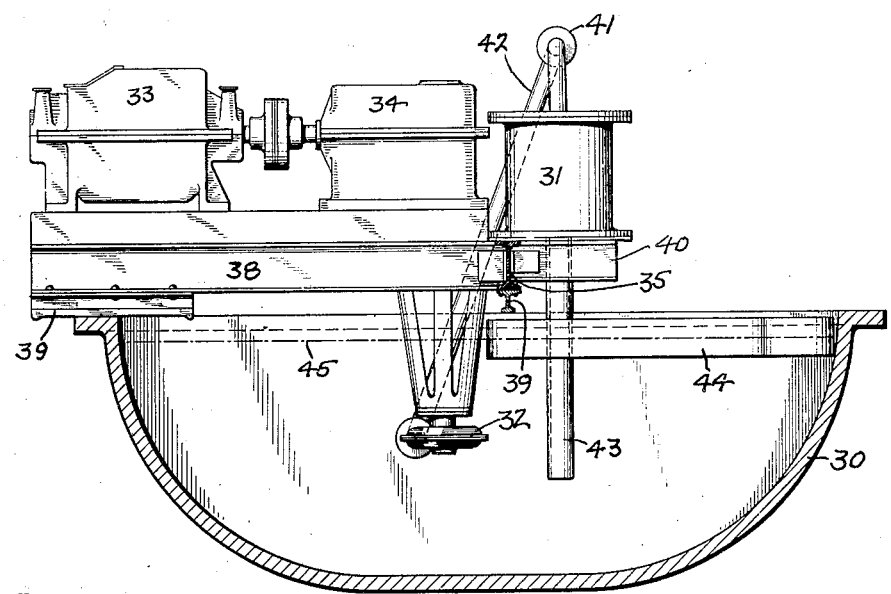
Fig. 3 is an elevational view partly in section showing an improved form of apparatus for carrying out the invention.

Referring now to Figs. 3 and 4, a lead bullion kettle 30 is shown, on which is positioned a reaction cylinder 31, pump 32, motor 33 and gear case 34, all mounted on a frame so that they can be moved from place to place as a single unit. The framework may comprise a transverse I-beam 35 to which may be connected at right angles a pair of spaced, parallel, laterally extending I-beams 38 which extend beyond the rim of the kettle. Located between each of the I-beams 35 and 38 and the rim of the kettle may be spacing pieces 39, for taking the wear incidental to placing the unit on and removing the unit from the several kettles in the refining plant, and to withstand the heat, thereby protecting the I-beams from heat and wear. A pair of projecting I-beams 40 may be provided extending laterally on the opposite side of the transverse I-beam 35 for supporting the reaction cylinder 31.

Supported on the laterally extending I-beams 38 may be the bed plate of a motor and gear unit, the pump 32 being suspended from the gear case 34 so as to be driven by the motor 33. The discharge side of the pump 32 is connected to the top of the reaction cylinder 31, a flanged coupling 41 being provided in the connecting pipe 42 as in Figs. 1 and 2. The reaction cylinder may be provided with a discharge pipe 43, as in Figs. 1 and 2, which extends beneath the surface of the bath. It will be understood that a chlorine tank with necessary connecting piping and a control valve may be provided to supply the reaction cylinder 31 with the necessary reagent as in Figs. 1 and 2. An iron ring 44 may be provided, if desirable, as in Figs. 1 and 2. The level of the lead bath may be at 45.

The improved process will be explained with reference to the modification shown in Fig. 1 but it will be understood that the process also may be practiced with the apparatus shown in Figs. 3 and 4. The motor and pump and also the reaction cylinder may be placed in the position shown after the kettle 1 has been filled to the level indicated, with molten lead. The parts of the connecting pipe 15 may be connected together by means of the flanged coupling 16, and the pump may be started and run for a few minutes to circulate the molten lead through the reaction cylinder to clean out any slag which may have adhered thereto from previous charges and also to warm up the cylinder. The pump is then stopped and the chlorine tank is connected to the reaction cylinder, and the chlorine turned on until it bubbles at the surface of the bath. The pump is then started and the chlorine valve opened as far as possible without allowing the gas to escape at the surface of the lead.

Since the reaction of chlorine and zinc produces considerable heat, sufficient lead bullion must be kept circulating through the reaction cylinder to prevent the temperature of the reaction cylinder from getting too high. This continuous circulation prevents corrosion of the reaction cylinder by the zinc chloride, and especially the chlorine, and washes the zinc chloride which is formed quickly through the discharge pipe and into the bath, where it floats to the surface in the form of a dross. In general, the cooling of the apparatus and the rate at which the heat is allowed to generate should be so arranged to give a temperature of about 670 degrees to 750 degrees F., at which temperature the improved process gives good results.

If the temperature is too high, the zinc chloride will volatilize quite appreciably where the lead bath is agitated or disturbed in any manner, as by the stream of lead discharged from the discharge pipe or by skimming off the zinc chloride; corrosion of the reaction cylinder by the chlorine and zinc chloride is increased at a relatively high temperature; also at higher temperatures the lead has a greater tendency to react with the chlorine which is undesirable. It is desirable to regulate the temperature to cause the top layers of molten zinc chloride slag floating on the bath to freeze. As the frozen layers are removed by skimming new layers freeze, thereby sealing the bath and preventing escape of the chlorine.

On the other hand, if the temperature is too low it becomes difficult to start the pump. Otherwise the process could be carried on at a temperature near the melting point of the bath.

Preferably the chlorine should be delivered to the reaction cylinder under a slight pressure. For example, the chlorine tank was placed in water having a temperature of 70 to 85 degrees F. This provided the proper conditions to cause the chlorine to be fed to the reaction cylinder at the desired rate of 200 to 250 pounds per hour, while the molten lead was circulated through the reaction chamber at the rate of 225 tons per hour.

When chlorine was fed at the above rate and the lead was pumped through the reaction cylinder in the particular manner and with the particular apparatus above stated, the level of the lead in the reaction cylinder was, for example, about 3 to 4 inches above the top of the discharge pipe. In general, the rate of flow of the lead and the other conditions should be arranged to allow a sufficient space within the reaction cylinder to be filled with chlorine gas, through which the lead bullion may be pumped in a stream, to insure thorough mixing of the chlorine with the impure lead.

If chlorine is fed at too great a rate to the reaction cylinder, it will be forced out the discharge pipe and may bubble through at the surface of the bath. On the other hand, if the chlorine is fed too slowly, the progress of dezincing is slowed down but no other detrimental effects result.

It will be evident from the foregoing that, in normal operation, for any given size of reaction cylinder and discharge pipe, the rate of passing the lead through the reaction cylinder may be varied over a definite range. The rate of feeding chlorine may be varied both in relation to the speed of passing lead through the reaction cylinder and the zinc contents of the lead at the particular time. In order to maintain a maximum rate of feeding chlorine, advantage should be taken of increased speed of pumping as the zinc content decreases.

It has been found satisfactory to skim the dross or slag of zinc chloride from the top of the bath in the kettle while running, since the top of the layer reforms and freezes so rapidly that no appreciable loss of chlorine results. After practically all of the zinc is removed from the bath, a white slag of lead chloride will appear. When this happens, the pump is stopped and when the chlorine bubbles through to the surface of the bath, the chlorine is shut off and the chlorine pipe disconnected. The pump is then started for a minute or so to insure that the reaction cylinder is thoroughly cleaned out. The kettle may be then skimmed clean. It is necessary to disconnect the chlorine pipe as above stated to prevent the chlorine piping 20 from filling with lead when the pump is started, and also to allow the escape of the chlorine from the reaction cylinder to the air when the pump is started, the chlorine in the cylinder being displaced by lead from the pump. Otherwise, if the chlorine pipe was not disconnected, the reaction cylinder would remain filled with chlorine and a slag would be formed at the surface of the lead in the connecting pipe and discharge pipe. This would prevent starting later, and would subject the reaction cylinder to corrosion from chlorine and zinc chloride when the apparatus was out of use.

The final slag on the surface of the bullion remains liquid much longer than previous slags, and as it does not freeze fast enough for skimming clean, and as it is too thin for ladling, considerable time may be lost in waiting for the slag to freeze if some remedy is not provided. In order to overcome this difficulty, a button of pure cold lead may be placed in the kettle after the apparatus is removed to cool the lead bath sufficiently for skimming.

By the improved process it is possible to refine lead containing zinc to such an extent that the refined product will contain less than 0.003 percent zinc. There is practically no loss of lead at the low temperatures at which the process is operated, since the selective action of the chlorine upon the zinc is more marked at low temperatures. The zinc chloride is relatively pure and is in commercial form without subsequent refining or treatment.

The material being treated is maintained in a relatively large pool in a receptacle having a large radiating surface whereby a relatively low temperature can be maintained notwithstanding the heat of the re-action which occurs. Consequently, there is no excessive agitation of the bath in the receptacle so that a layer of dross may readily form on top of the bath, which, in the case of zinc chloride, rapidly cools at atmospheric temperatures, thereby forming a seal that prevents escape of chlorine which might otherwise occur.

Although a description has been given for purposes of illustration of particular forms of the apparatus and of certain details of a method of practicing the invention, it is obvious that the invention is not limited to this particular apparatus and method, but is broad enough to include any apparatus of any size and any method, so long as the broad teaching of the invention is followed. Furthermore, the invention is not limited to the purification of lead containing zinc by means of gaseous chlorine, but is broad enough to include the purification of any material or metal by any kind of a gaseous or other reagent.

Having thus described my invention, I claim:

Apparatus for the purification of metals, comprising a framework adapted to be supported by the rim of a kettle containing a bath of molten metal, a motor supported by said framework, a pump depending from said framework and driven by said motor, said pump being adapted to be immersed below the surface of the bath, a reaction cylinder supported by said framework, said reaction cylinder having a detachable head, a connecting pipe having a flanged union connecting the discharge end of said pump with said detachable head, means connected to the detachable head for supplying a reactive gas to the reaction cylinder, a discharge pipe depending from the base of the reaction cylinder and adapted to be immersed in the bath to a substantial extent.

In testimony whereof I have hereunto set my hand.

JESSE OATMAN BETTERTON.